(12) United States Patent
Nakayasu et al.

(10) Patent No.: US 7,651,129 B2
(45) Date of Patent: Jan. 26, 2010

(54) GAS GENERATOR FOR RESTRAINING DEVICE

(75) Inventors: Masayuki Nakayasu, Hyogo (JP); Gen Kinoshita, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 12/232,471

(22) Filed: Sep. 17, 2008

(65) Prior Publication Data

US 2009/0091110 A1 Apr. 9, 2009

Related U.S. Application Data

(60) Provisional application No. 60/974,703, filed on Sep. 24, 2007.

(30) Foreign Application Priority Data

Sep. 18, 2007 (JP) .............................. 2007-240460

(51) Int. Cl.
*B60R 21/26* (2006.01)
(52) U.S. Cl. ..................................................... 280/741
(58) Field of Classification Search ................. 280/740, 280/741, 742
See application file for complete search history.

(56) References Cited

U.S. PATENT DOCUMENTS 3,904,221 A 9/1975 Shiki et al.
6,106,009 A 8/2000 Katsuda et al.
6,234,521 B1 5/2001 Katsuda et al.
6,412,815 B1 7/2002 Nakashima et al.
6,722,694 B1 4/2004 Nakashima et al.
2003/0010247 A1 1/2003 Miyaji et al.

FOREIGN PATENT DOCUMENTS

| JP | 10-95303 A | 4/1998 |
|---|---|---|
| JP | 10-119705 A | 5/1998 |
| JP | 2001-97175 A | 4/2001 |
| JP | 2001-225711 A | 8/2001 |
| JP | 2001-239913 A | 9/2001 |

*Primary Examiner*—Faye M. Fleming
(74) *Attorney, Agent, or Firm*—Birch, Stewart, Kolasch & Birch, LLP

(57) ABSTRACT

A gas generator for a restraining device includes a housing formed by joining and integrating a diffuser shell having a gas discharge port and a closure shell, and a gas generating agent, an igniter, and a cylindrical filter, accommodated inside the housing. The housing has a top plate, a circumferential wall surface, and a bottom plate, and a plurality of protruding portions concaved inwardly and formed with a distance from each other on at least either of an upper annular corner portion located at a boundary portion between the top plate and the circumferential wall surface and a lower annular corner portion located at a boundary portion between the bottom plate and the circumferential wall surface. Part of the cylindrical filter is supported and fixed by the plurality of protruding portions, and a gap is provided between an outer circumferential surface of the cylindrical filter and the gas discharge hole.

4 Claims, 4 Drawing Sheets

US 7,651,129 B2

GAS GENERATOR FOR RESTRAINING DEVICE

This nonprovisional application claims priority under 35 U.S.C § 119(a) on patent application Ser. No. 2007-240460 filed in Japan on 18 Sep. 2007 and 35 U.S.C § 119(e) on U.S. Provisional Application No. 60/974,703 filed on 24 Sep. 2007, which are incorporated by reference.

BACKGROUND OF INVENTION

1. Field of Invention

The present invention relates to a gas generator for a restraining device of a vehicle, such as an airbag apparatus.

2. Description of Related Art

In a gas generator in which a combustion chamber is formed inside a cylindrical filter, when the filter is attached to a predetermined position of a housing, the attachment has to be made with a certain restraining force to prevent the filter from becoming shaky or moving in subsequent assembling.

In U.S. Pat. No. 6,106,009, a housing 1 is formed by a cylindrical member 2 containing a circumferential wall portion 22 and a side surface portion 21 and a cup-shaped member 3 that closes the opening of the cylindrical member 2, and a cylindrical filter 51 is disposed inside the housing. At one end (on the igniter 4 side) of the housing, the outer diameter of the circumferential wall portion 22 is reduced by the inclined surface 24, and positioning is performed by abutting the inner circumferential surface of this portion of reduced diameter against an outer circumferential surface of one end of the filter 51.

U.S. Pat. No. 3,904,221 describes an aspect in which both ends of a cylinder 5 having a hole 7 are closed, and a filter 1, an igniter 3, and a gas generating agent 2 are accommodated inside the cylinder. FIG. 2 shows an aspect in which a retainer-like member with a bolt mounted on the lower side thereof is attached, both end portions in the axial direction are reduced in diameter, and the outer circumferential surface of the cylinder 5 is also disposed in the abutment state thereof.

JP-A No. 2001-239913 describes an aspect in which a filter 5, a gas generating agent 8, and an igniter 6 are disposed inside a housing 3 containing a diffuser shell 1 and a closure shell 2, and a bent portion 56, which is a boundary portion of a circumferential wall portion 55 of the closure shell 2 and a circular portion 54, abuts against a circumferential edge at the lower end of the filter 5.

SUMMARY OF THE INVENTION

The present invention provides a gas generator for a restraining device, including a housing formed by joining and integrating a diffuser shell having a gas discharge port and a closure shell, a gas generating agent, an igniter and a cylindrical filter accommodated inside the housing, the housing having a top plate, a circumferential wall surface and a bottom plate, a plurality of protruding portions concaved inwardly and formed with a distance from each other on at least either of an upper annular corner portion located at a boundary portion between the top plate and the circumferential wall surface and a lower annular corner portion located at a boundary portion between the bottom plate and the circumferential wall surface, part of the cylindrical filter being supported and fixed by the plurality of protruding portions, and a gap being provided between an outer circumferential surface of the cylindrical filter and the gas discharge hole.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION OF INVENTION

Figure 1:
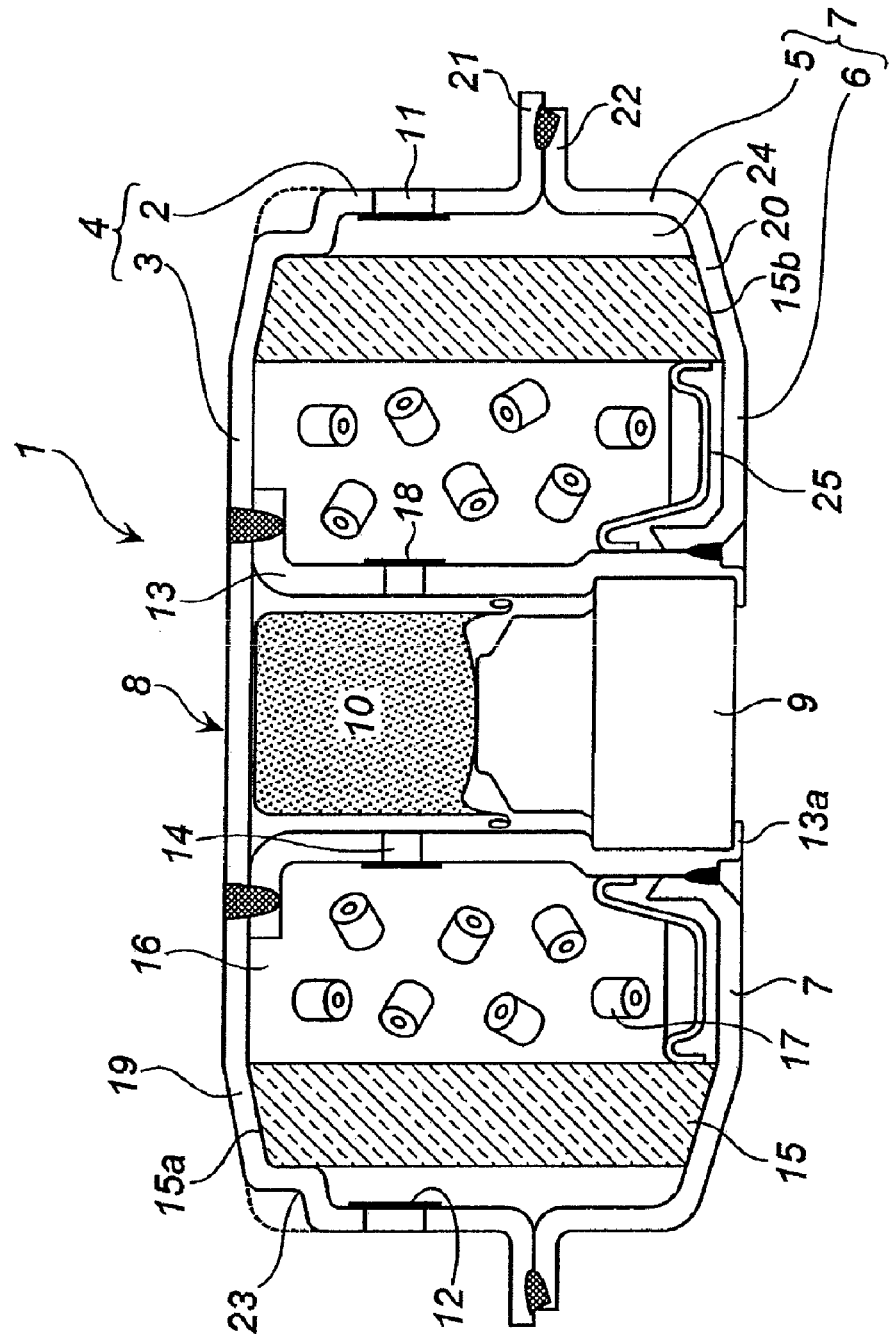
FIG. 1 shows an axial sectional view of a gas generator for a restraining device in accordance with the present invention.

In the conventional gas generators, although the filter can be positioned during the assembly process, it is not sufficient to attach the filter with a certain restraining force to prevent the filter from being shaky or moving in subsequent assembling.

The present invention provides a gas generator for a restraining device that can be easily assembled.

When a gas generating agent is used in a gas generator for a restraining device such as an airbag device, a cylindrical filter is used for filtering and cooling the combustion gas. When such a cylindrical filter is disposed inside a housing, the filter is so disposed that a gap is formed between an outer circumferential surface of the cylindrical filter and a gas discharge port so that the combustion gas be discharged from the gas discharge ports through the entire cylindrical filter.

A housing has a top plate, a circumferential wall surface, and a bottom plate and is known to be formed, for example, by joining and integrating a closure shell and a diffuser shell having a gas discharge port at respective flange portions. A housing is also known in which an opening of a cup-shaped container (or a box-like container having no lid) having a gas discharge port in a circumferential wall is closed with a lid plate or bottom plate. In such an aspect, the cup-shaped container or box-like container is equivalent to the diffuser shell, and the lid plate or bottom plate is equivalent to the closure shell.

When a cylindrical filter is disposed in a housing of such a structure, for example, first, the cylindrical filter is attached to a predetermined location of the diffuser shell (that is, the location in which a gap is formed between the outer circumferential surface of the cylindrical filter and the gas discharge port), and then the closure shell is placed on the diffuser shell and the diffuser shell and closure shell are welded together and integrated at the flanges thereof. In this case, the cylindrical filter is pressed and fixed from both sides by the diffuser shell and closure shell.

In accordance with the present invention, the positioning of the cylindrical filter during the attachment thereof to the diffuser shell or closure shell is facilitated by a plurality of protruding portions formed inside the housing, and the cylindrical filter can be restrained so as to prevent it from being shaky or moving in subsequent assembling process.

A known cylindrical filter is used in the invention. For example, a filter manufactured by the method described in JP-A No. 10-119705, a filter formed by winding a metal wire into several layers, a filter 51 described in U.S. Pat. No. 6,106,009, and a coolant 5 described in JP-A No. 2001-239913 can be used.

The protruding portions are obtained by concaving the annular corner portion on the upper side or lower side of the circumferential wall surface in the axial direction of the housing, when viewed from the outside of the housing, and the protruding portions protrude inward into the housing. A plurality of protruding portions are formed separately from each other with an appropriate distance.

The depth of the concavity of the protruding portion (height of the protrusion) is determined in relation to the outer diameter of the cylindrical filter. The diameter of the circle that comes into contact with the distal ends of the plurality of protruding portions is set to be slightly less than the outer diameter of the cylindrical filter.

With such a setting, when the cylindrical filter is disposed in the diffuser shell, the cylindrical filter is press-inserted to the plurality of protruding portions disposed annularly, and shallow concavities are formed on the outer circumferential surface of the cylindrical filter that is in contact with the plurality of protruding portions. As a result, the cylindrical filter can be easily positioned and the cylindrical filter is restrained and prevented from moving in a subsequent process of attaching the diffuser shell to the closure shell.

When the plurality of protruding portions are formed in the upper annular corner portion, it is preferred that the plurality of protruding portions and a plurality of gas discharge ports formed in the circumferential wall of the housing (circumferential surface of the diffuser shell) have different locations in the axial direction. Thus, the protruding portion may be formed between two gas discharge ports adjacent in the circumferential direction, or the protruding portion may be formed in an intermediate position between two gas discharge ports adjacent in the circumferential direction. By adjusting the formation positions of the protruding portions and gas discharge ports in such a manner, it is possible to ensure sufficient spacing between the gas discharge ports and the outer circumferential surface of the cylindrical filter.

The invention preferably relates to the gas generator for a restraining device, wherein the plurality of protruding portions are formed in at least one of portions in the circumferential wall surface that is close to the top plate and the bottom plate.

Such an aspect is identical to that of the invention, with the exception of the formation positions of protruding portions, and the same operation effect is obtained.

The invention preferably relates to the gas generator for a restraining device, wherein 2 to 10 protruding portions are formed equidistantly.

The number of protruding portions is preferably 2 to 10, more preferably 2 to 8, even more preferably 2 to 6, and particularly preferably 3 or 4.

Because the housing of the gas generator for a restraining device in accordance with the present invention has a plurality of protruding portions, the cylindrical filter can be easily positioned and restrained in assembling and operations in subsequent assembling process are facilitated. Therefore, the entire assembling operation is facilitated.

Further, by contrast with the aspect in which the entire circumference of the filter end portions abuts against the housing, as described in U.S. Pat. No. 6,106,009 and U.S. Pat. No. 3,904,221, in the gas generator for a restraining device in accordance with the present invention, the surface area of the housing that is in contact with the outer circumferential surface of the filter is reduced to a necessary minimum by the protruding portions. Therefore, the filtration and cooling effects can be increased by comparison with those attained with the structures described in U.S. Pat. No. 6,106,009 and U.S. Pat. No. 3,904,221.

Figure 2:
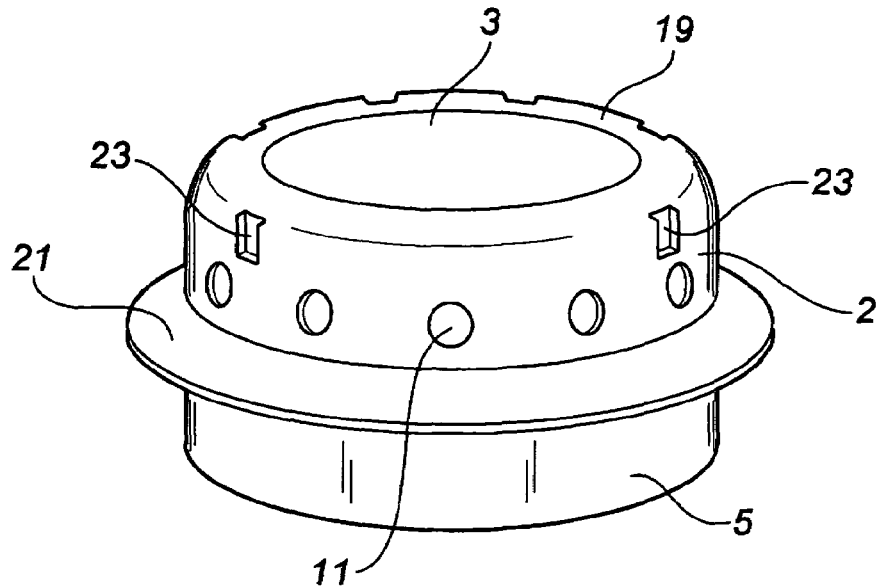
FIG. 2 shows a perspective view of the gas generator shown in FIG. 1.

EMBODIMENT OF INVENTION (1) Gas generator shown in FIG. 1, FIG. 2 and method for assembling the same.

Figure 3:
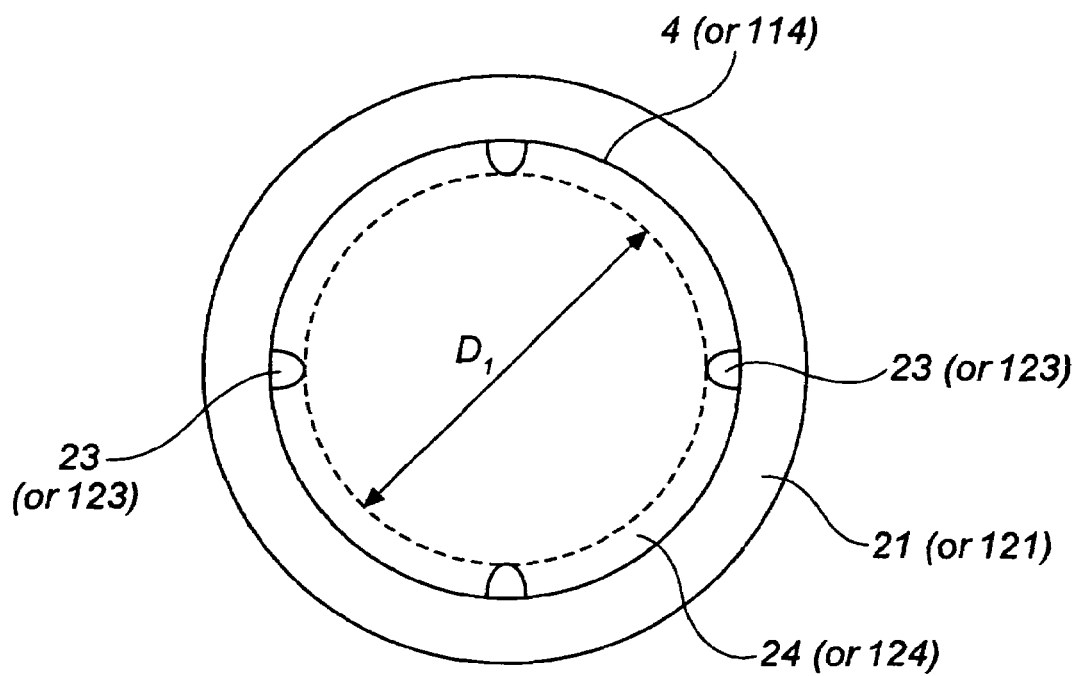
FIG. 3 shows a schematic drawing illustrating the internal structure of the gas generator shown in FIG. 1, FIG. 4.

FIG. 1 is an axial sectional view of a gas generator in accordance with the present invention. FIG. 2 is a perspective view of the gas generator shown in FIG. 1. FIG. 3 is a schematic drawing illustrating the dimensional relationship between a contact circle of a plurality of protruding portions and an outer diameter of a cylindrical filter. The gas generator shown in FIG. 1 and FIG. 2 is identical to the known gas generator, with the exception of protruding portions and a method for attaching a cylindrical filter using the same, and can be also used in the gas generator of a dual type such as shown in FIG. 1 of JP-A No. 2001-225711 and FIG. 1 of JP-A No. 2001-97175.

<Gas Generator>

A gas generator 1 has a housing 8 in which a diffuser shell 4 containing a circumferential wall portion 2 and a circular top plate 3 and a closure shell 7 also containing a circumferential wall portion 5 and a circular bottom plate 6 are integrated by welding at flanges 21, 22.

The diffuser shell 4 has a plurality of gas discharge ports 11 formed, equidistantly in the circumferential direction, at the circumferential wall portion 2; these gas discharge ports are closed from inside with a seal tape 12. An annular upper inclined surface 19 is formed at a circumferential edge portion of the top plate 3 of the diffuser shell 4. The upper inclined surface 19 is declined toward the outer circumferential edge of the top plate 3. An annular lower inclined surface 20 is formed at a circumferential edge portion of the bottom plate 6 in the closure shell 7.

An inner tube 13 is disposed inside the housing 8, and an electric igniter 9 and a transfer charge 10 are disposed inside the inner tube. The inner tube 13 is attached concentrically with the housing 8, and a nozzle 14 is formed on the circumferential wall surface thereof. The nozzle 14 is closed from the outside with a seal member 18.

A cylindrical filter 15 is disposed inside the housing 8, and an annular combustion chamber 16 is formed outside the inner tube 13 and inside of the cylindrical filter 15. The inside space of the inner tube 13 communicates with the combustion chamber 16 when the seal member 18 is fractured. A gas generating agent 17 that generates gas on combustion is loaded into the combustion chamber 16.

An upper end surface 15a of the cylindrical filter 15 abuts against the upper inclined surface 19 and a lower end surface 15b of the filter abuts against the lower inclined surface 20. The cylindrical filter 15 has a function of cooling the combustion gas generated by combustion of the gas generating agent 17, or a function of collecting the residues contained in the combustion gas, or both these functions.

A total of four protruding portions 23 are formed equidistantly in the circumferential direction at the boundary portion between the upper inclined surface 19 and the circumferential wall portion 2 of the diffuser shell 4. The protruding portion 23 is obtained by concaving the boundary portion of the diffuser shell 4 inwardly and protrudes inside the housing 8. In order to press-insert the cylindrical filter 15 easily, it is preferred that at least the distal end portion of the protruding portion 23 has a curved or spherical surface. The protruding portion 23 can be formed, for example, by press-molding performed simultaneously with press-molding of the diffuser shell 4, but in no way limited to this method.

The protrusion height (depth of the concavity) of the plurality of protruding portions 23 is set, as shown in FIG. 3, such that a diameter D1 of a contact circle (shown by a dotted line) passing through the distal end portions of the plurality of protruding portions 23 is slightly less than the outer diameter of the cylindrical filter 15.

In FIG. 1 and FIG. 2, the protruding portions 23 are formed only on the diffuser shell 4, but they can be also formed on the closure shell 7. Further, in order to block a short-pass of the gas from an upper end surface 15a of the filter 15, a member equivalent to a plate member 32 shown in FIG. 1 of JP-A No. 10-95303 may be provided.

<Gas Generator Assembling Method>

The diffuser shell 4 having the inner tube 13 joined thereto is placed by the top plate 3 facing down. The filter 15 is then press-inserted inside the four protruding portions 23. In this case, as shown in FIG. 3, because the outer diameter of the cylindrical filter 15 is slightly larger than the diameter D1 of the inscribed circle of the four protruding portions 23, the portions of the press-inserted cylindrical filter 15 that are in contact with the protruding portions 23 assume a state in which they are slightly concaved inwardly and restrained. Such attachment of the cylindrical filter 15 enables the positioning (in other words, a gap 24 is formed between the outer circumferential surface of the cylindrical filter 15 and the circumferential wall portions 2, 5 of the housing 8) and makes it possible to hold the cylindrical filter 15 so that it does not move during subsequent assembling process.

Then a predetermined amount of the gas generating agent 17 is loaded inside (combustion chamber 16) the cylindrical filter 15 and a plate member 25 is thereafter attached above the gas generating agent. The flange 22 of the closure shell 7 is placed on the flange 21 of the diffuser shell 4, the flanges 21, 22 are welded together, and the joint portion of the closure shell 7 and inner tube 13 are also welded.

When the flanges 21, 22 are welded together, the cylindrical filter 15 is attached inside the housing 8 in a state in which the cylindrical filter is compressed in the axial direction by the upper inclined surface 19 and lower inclined surface 20. As a result, the upper end surface 15a and lower end surface 15b are deformed to a shape matching the shape of the upper inclined surface 19 and lower inclined surface 20, respectively.

Finally, the transfer charge 10 and igniter 9 are inserted into the inner tube 13, and a distal end portion 13a at the lower end of the inner tube 13 is crimped.

In the gas generator 1, the igniter 9 actuated by receiving an actuation signal causes ignition and combustion of the transfer charge 10, the flame thereof breaks the seal member 18 of the inner tube 13, passes through the flame transferring hole 14, and is released into the combustion chamber 16. The flame from the transfer charge 10 causes ignition and combustion of the gas generating agent 17. The combustion gas generated by the combustion passes through the filter 15, breaks the seal tape 12, and is released from the gas discharge port 11 to the outside. In this case, because the protruding portions 23 formed in the above-described manner are disposed in four locations at a distance from each other, they neither hinder the passage of the combustion gas through the filter 15 nor degrade the filtration function or cooling function of the filter 15.

Figure 4:
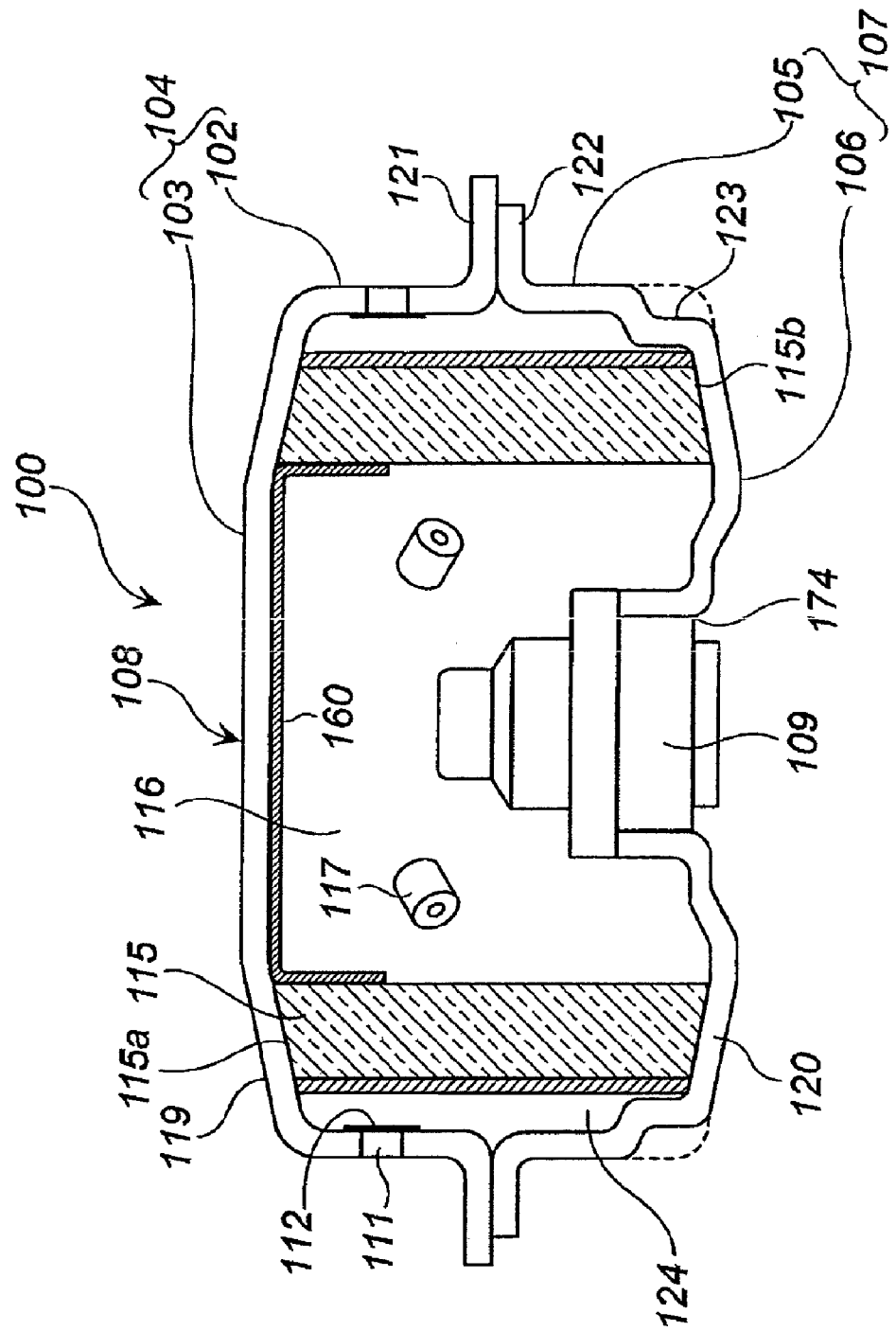
FIG. 4 shows an axial sectional view of a gas generator for a restraining device of another embodiment of the present invention.
Figure 5:
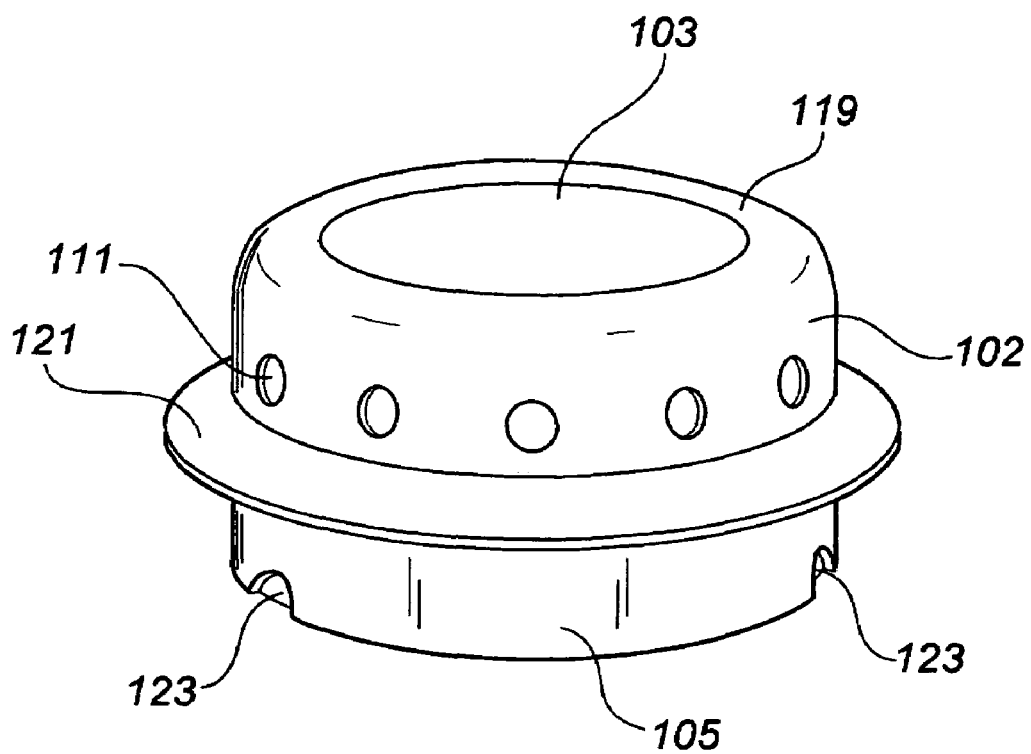
FIG. 5 shows a perspective view of the gas generator shown in FIG. 4.

(2) Gas Generator Shown in FIG. 4, FIG. 5

FIG. 4 is an axial sectional view of a gas generator of another embodiment of the present invention. FIG. 5 is a perspective view of the gas generator shown in FIG. 4. FIG. 3 is a schematic drawing illustrating the dimensional relationship between a contact circle of a plurality of protruding portions and an outer diameter of a cylindrical filter. The gas generator shown in FIG. 4 and FIG. 5 is identical to the known gas generator, with the exception of protruding portions and a method for attaching a cylindrical filter using the same, and can be also used in the gas generator of a dual type such as shown in FIG. 1 of JP-A No. 2001-225711 and FIG. 1 of JP-A No. 2001-97175.

<Gas Generator>

A gas generator 100 has a housing 108 in which a diffuser shell 104 containing a circumferential wall portion 102 and a circular top plate 103 and a closure shell 107 also containing a circumferential wall portion 105 and a circular bottom plate 106 are integrated by welding at flanges 121, 122.

The diffuser shell 104 has a plurality of gas discharge ports 111 formed, equidistantly in the circumferential direction, at the circumferential wall portion 102; these gas discharge ports are closed from inside with a seal tape 112. An annular upper inclined surface 119 is formed at a circumferential edge portion of the top plate 103 of the diffuser shell 104. The upper inclined surface 119 is declined toward the outer circumferential edge of the top plate 103. An annular lower inclined surface 120 is formed at a circumferential edge portion of the bottom plate 106 in the closer shell 107.

A cylindrical filter 115 is disposed inside the housing 108, and a combustion chamber 116 is formed in the inside of the cylindrical filter 115. A gas generating agent 117 that generates gas on combustion is loaded into the combustion chamber 116.

An upper end surface 115a of the cylindrical filter 115 abuts against the upper inclined surface 119 and a lower end surface 115b of the filter abuts against the lower inclined surface 120. The cylindrical filter 115 has a function of cooling the combustion gas generated by combustion of the gas generating agent 117 or a function of collecting the residues contained in the combustion gas, or both these functions.

An igniter 109 is attached in a central hole 174 formed in a central portion of the bottom plate 106 of the closure shell 107. A sealing material may be loaded to ensure air tightness between the igniter 109 and the bottom plate 106 where the central hole 174 is formed.

A total of four protruding portions 123 are formed equidistantly in the circumferential direction at the boundary portion between the lower inclined surface 120 and the circumferential wall portion 105 of the closure shell 107. The protruding portion 123 is obtained by concaving the boundary portion of the closure shell 107 inwardly and protrudes inside the housing 108. In order to press-inserting the cylindrical filter 115 easily, it is preferred that at least the distal end portion of the protruding portion 123 has a curved or spherical surface. The protruding portion 123 can be formed, for example, by press-molding performed simultaneously with press-molding of the closure shell 107, but not being limited to this method.

The protrusion height (depth of the concavity) of the plurality of protruding portions 123 is set, as shown in FIG. 3, such that a diameter D1 of a contact circle (shown by a dotted line) passing through the distal end portions of the plurality of protruding portions 123 is slightly less than the outer diameter of the cylindrical filter 115.

Reference numeral 160 stands for a shallow cup-shaped member that closes an upper opening of the filter 115 and also has a function of preventing a short pass of the gas at an upper end surface 115a of the filter 115. In FIG. 4 and FIG. 5, the protruding portions 123 are formed only on the closure shell 107, but they can be also formed on the diffuser shell 104.

<Gas Generator Assembling Method>

The closure shell 107 is placed by the bottom plate 106 of the closure shell 107 facing down, and the igniter 109 is attached to the central hole 174 of the closure shell. The filter 115 is then press-inserted into the four protruding portions 123. In this case, as shown in FIG. 3, because the outer diameter of the cylindrical filter 115 is slightly larger than the diameter of D1 of the inscribed circle of the four protruding portions 123, the portions of the press-inserted cylindrical filter 115 that are in contact with the protruding portions 123 assume a state in which they are slightly concaved inwardly and restrained. Such an attachment of the cylindrical filter 115 enables the positioning (in other words, a gap 124 is formed between the outer circumferential surface of the cylindrical filter 115 and the circumferential wall portions 102, 105 of the housing 108) and makes it possible to hold the cylindrical filter 115 so that it does not move during subsequent assembling process.

Then a predetermined amount of the gas generating agent 117 is loaded inside (combustion chamber 116) the cylindrical filter 115 and a cup-shaped member 160 is thereafter attached above the gas generating agent. The flange 121 of the diffuser shell 104 is placed on the flange 122 of the closure shell 107, and the flanges 121, 122 are welded together.

When the flanges 121, 122 are welded together, the cylindrical filter 115 is attached inside the housing 108 in a state in which the cylindrical filter is compressed in the axial direction by the upper inclined surface 119 and lower inclined surface 120. As a result, the upper end surface 115a and lower end surface 115b are deformed to a shape matching the shape of the upper inclined surface 119 and lower inclined surface 120, respectively.

In the gas generator 100, the igniter 109 actuated by receiving an actuation signal causes ignition and combustion of the gas generating agent 117 within the combustion chamber 116. As a result, high-temperature and high-pressure gas is generated. This combustion gas enters a gap 124 through the filter 115, breaks the seal tape 112, and is released from the gas discharge port 111 to the outside of the housing 108. In this case, because the protruding portions 123 formed in the above-described manner are disposed in four locations at a distance from each other, they do not hinder the passage of the combustion gas through the filter 115 and do not degrade the filtration function or cooling function of the filter 115.

The invention thus described, it will be obvious that the same may be varied in many ways. Such variation are not to be regarded as a departure from the spirit and scope of the invention, and all such modifications as would be obvious to one skilled in the art are intended to be included within the scope of the following claims.

The invention claimed is:

1. A gas generator for a restraining device, comprising:
 a housing formed by joining and integrating a diffuser shell having a gas discharge port and a closure shell, the housing accommodating, therein, a gas generating agent, an igniter, and a cylindrical filter;
 the housing having,
  a top plate,
  a circumferential wall surface,
  a bottom plate, and
  a plurality of protruding portions concaved inwardly, each protruding portion being formed discontinuously and formed independently from one another, the plurality of portions being formed in at least one of an upper annular corner portion located at a boundary portion between the top plate and the circumferential wall surface and a lower annular corner portion located at a boundary portion between the bottom plate and the circumferential wall surface,
 part of the cylindrical filter being supported and fixed to the housing by engaging with the plurality of protruding portions, and defining a gap between an outer circumferential surface of the cylindrical filter and the gas discharge hole.

2. The gas generator for a restraining device according to claim 1, wherein the plurality of protruding portions are formed in at least one of portions in the circumferential wall surface that is close to the top plate and the bottom plate.

3. The gas generator for a restraining device according to claim 1, wherein 2 to 10 protruding portions are formed equidistantly.

4. The gas generator for a restraining device according to claim 1, wherein a distal end portion of said each protruding portion has a curved surface protruding towards an inside of the housing.

* * * * *